United States Patent
Zhang et al.

(10) Patent No.: US 9,663,370 B2
(45) Date of Patent: May 30, 2017

(54) LARGE-SCALE PREPARATION METHOD FOR GRAPHENE QUANTUM DOTS

(71) Applicant: SHENZHEN CANTONNET ENERGY SERVICES CO., LTD, Shenzhen (CN)

(72) Inventors: Mingdong Zhang, Shenzhen (CN); Linde Zhang, Shenzhen (CN)

(73) Assignee: SHENZHEN CANTONNET ENERGY SERVICES CO., LTD, Shenzhen (CN)

( * ) Notice: Subject to any disclaimer, the term of this patent is extended or adjusted under 35 U.S.C. 154(b) by 0 days.

(21) Appl. No.: 15/109,817

(22) PCT Filed: Jan. 17, 2014

(86) PCT No.: PCT/CN2014/070804
§ 371 (c)(1),
(2) Date: Jul. 6, 2016

(87) PCT Pub. No.: WO2015/106437
PCT Pub. Date: Jul. 23, 2015

(65) Prior Publication Data
US 2016/0325999 A1    Nov. 10, 2016

(51) Int. Cl.
*C01B 31/04* (2006.01)
*C09K 11/65* (2006.01)
(Continued)

(52) U.S. Cl.
CPC ...... *C01B 31/0446* (2013.01); *C01B 31/0438* (2013.01); *C01B 31/0476* (2013.01);
(Continued)

(58) Field of Classification Search
CPC .............. C01B 31/043; C01B 31/0438; C01B 31/0446
See application file for complete search history.

(56) References Cited

U.S. PATENT DOCUMENTS

2015/0298977 A1* 10/2015 Yoon .................. B82Y 15/00
                                                              204/157.43

FOREIGN PATENT DOCUMENTS

CN    102807209 A    12/2012
CN    103787319 A    5/2014

OTHER PUBLICATIONS

Chen, Shuai et al., "Preparation of Excitation-independent Photoluminescent Graphene Quantum Dots with Visible-light Excitation/Emission for Cell Imaging", Chem. Eur. J., vol. 19, Oct. 7, 2013 (Oct. 7, 2013), pp. 15918-15923.

* cited by examiner

*Primary Examiner* — Richard M Rump
(74) *Attorney, Agent, or Firm* — Gokalp Bayramoglu (57) ABSTRACT

A method for preparing graphene quantum dots in large-scale, comprising: dispersing graphene oxide uniformly in the first solvent to obtain a first dispersion liquid, adding reducing agent into the first dispersion liquid and dispersing uniformly to give a mixed solution; treating the mixed solution for 10~60 mins under microwave environment with the power being at 500~800 W, then cooling and separating to obtain the solid as a crude product; mixing, one of the reducing polyhydroxy aldehyde or organic acid with the crude product, following by adding the Lewis acid to obtain a mixture, dispersing the mixture in a second solvent uniformly to obtain a second dispersion liquid; putting wherein the second dispersion liquid into microwave treatment for 0.2-1 hours with the microwave power being 500~800 w, then stripping for 2~3 hours under ultrasonic power of 120~300 w, purifying to obtain the graphene quantum dots.

15 Claims, 5 Drawing Sheets

(51) Int. Cl.
*B82Y 30/00* (2011.01)
*B82Y 40/00* (2011.01)

(52) U.S. Cl.
CPC ........... *C01B 31/0492* (2013.01); *B82Y 30/00* (2013.01); *B82Y 40/00* (2013.01); *C09K 11/65* (2013.01); *Y10S 977/734* (2013.01); *Y10S 977/774* (2013.01); *Y10S 977/842* (2013.01)

LARGE-SCALE PREPARATION METHOD FOR GRAPHENE QUANTUM DOTS

TECHNICAL FIELD

The present invention relates to a preparation method in the field of nanomaterials, in particular, relates to large-scale preparation method for graphene quantum dots.

BACKGROUND

Since Andre Geim and Konstanin Novoselof from University of Manchester in UK successfully stripped pyrolytic graphite out and observed graphene in 2004, the investigation of carbon-based new material has been remaining, a hot topic in relevant areas. The success of stripping graphene out breaks the prediction about thermal instability of two-dimensional crystal theoretical, and brings about possibilities for more investigations and explorations in new fields.

Perfect graphene is supposed to own ideal two-dimensional structure, which consists of hexagonal lattice. Every single carbon atom is combined with other three carbon atoms by σ-bond in the direction of lattice plane, and non-bonding electrons serves as π-electrons, forming π-orbit system vertical to the lattice plane in which they could move randomly. But more importantly, due to the unique structure of graphene, the energy band structure shows in the form of the Dirac cone, and graphene conduction and valence bands overlap on the Dirac point. Therefore, effective masses of the electron and cavity on the Dirac point are zero, and the corresponding mobility of electrons and cavity are identical and infinitely close to infinity. This means that the carriers can be either electron or cavity, and the mobility of carriers is large, so the ideal graphene should have excellent conductivity. It is predicted that the current density of graphene is six orders of magnitude higher than that of copper.

At present, a number of exciting research work on large-layer graphene has been published. Meanwhile, two dimensional graphene and graphene oxide particles, the sheet size of which is within Bohr radius, is also investigated intensively. Due to the remaining oxidative functional groups or defect and smaller size, the energy band of such graphene particles is not Continuous. As a result, its carriers can be excited. After being excited carriers form excitons, and the excitons are limited to the band gap of the graphene in the three spatial directions. The thickness of the monolayer grapheme is about 1 nm and the sheet size is around Bohr radius. The band gap of such graphene is large, and therefore the laser emission wavelength formed after deexcitation of the excitons is wider and shows excellent laser characteristics. Such graphene particles are called graphene quantum dots because they have similar characteristics of semiconductor quantum dots in inorganic materials. The radius of graphene quantum dots is within Bohr radius. The quantum dots are non-toxic, with narrow fluorescence wavelength and wide laser wavelength, therefore they can be widely used in the light-emitting diode (LED), biological imaging, photovoltaic devices and sensor.

According to the present research on graphene quantum dots, there are mainly four ways in the preparation of graphene quantum dots. The four methods are as follows: the secondary oxidation based on graphene reoxidation, organic synthesis method starting from small organic molecule, electron or ion beam etching method, and the micro-cutting of the carbon material. Among these methods, second oxidation could not complete subsequent oxidation step well without high quality graphene material. This method is costly and not favorable for industrialization; organic synthesis has complex and tedious process, and is not suitable for industrial production; electron or ion beam etching method has the problem of small yield and could not be adopted for large-scale production; micro-cutting of the carbon material has the disadvantages of complex process and low yield. Therefore, it is imperative to provide a method for large-scale preparation for graphene quantum dots with simple process, which promotes the research progress on quantum dot.

INVENTION DESCRIPTION

Based on this, it is necessary to propose a method for preparing grapheme quantum dots in large-scale with simple process and high yield.

A method for preparing graphene quantum dots in large-scale, comprise the steps of:

Graphene oxide was dispersed uniformly in the first solvent to obtain the first dispersion liquid; reducing agent was added into the first dispersion liquid and dispersed uniformly to get a mixed solution;

The mixed solution was reacted for 10~60 mins under microwave environment with power being at 500~800 W, then cooled down the solution and separated to obtain the solid as the crude product after solid-liquid separation;

One of the reducing polyhydroxy aldehyde or organic acid was mixed with the crude product, followed by adding the Lewis acid to obtain a mixture, and the mixture was dispersed in a second solvent uniformly to obtain the second dispersion liquid;

Wherein the second dispersion liquid was put into microwave treatment for 0.2-1 hours with microwave power being 500~800 w, then stripped for 23 hours under 120~300 w ultrasonic, purified to obtain the graphene quantum dots.

In an embodiment, before the step wherein the mixed solution is treated under microwave environment for 10~60 mins with the microwave power being 500~800 W, a step of ultrasonic stirring is included, wherein the step of ultrasonic stirring comprises: the mixed solution is stirred under ultrasonic for 0.5~4 hours with the ultrasonic power being 120~300 W.

In an embodiment, before the step wherein the second dispersion liquid is treated under microwave environment for 0.2~1 hours with the microwave power being 500~800 W, a process of ultrasonic dispersion, which is, the second dispersion liquid is dispersed under ultrasonic environment for 0.5~2 hours with the ultrasonic power being 120~300 W.

In an embodiment, wherein the first and second solvents comprises at least one agent selected from the group consisting of water, dimethoxyethane, an aqueous solution of polyvinyl alcohol, glycerol, triethylene glycol and N-methyl pyrrolidone.

In an embodiment, the concentration of wherein the graphene oxide in the first dispersion liquid is 26~10 mg/ml.

In an embodiment, wherein the reducing agent comprises at least one agent selected from the group consisting of citric acid, gluconic acid, formic acid, ascorbic acid, oxalic acid, sodium citrate, sodium gluconate, sodium formate, sodium oxalate and sodium ascorbate.

In an embodiment, wherein the weight ratio of the graphene oxide to the reducing agent is 1:3~10.

In an embodiment, wherein the step of treating the mixed solution for 10~60 min under microwave environment with the microwave power being 500~800 W comprises: the mixed solution reacted for 5~30 min under microwave environment with power being 500~800 W, then the first solvent is added. The mixed solution continued to react for 5~30 min under microwave environment with power being 500~800 W; wherein the volume of the added first solvent is 10~15% of the initial volume of the first solvent.

In an embodiment, the weight ratio of the crude product to one of the reducing polyhydroxy aldehyde or organic acid is 1:5~10.

In an embodiment, the reducing polyhydroxy aldehyde is glucose or adipaldehyde.

In an embodiment, the Lewis acid comprises at least one agent selected from the group consisting of ferric chloride, aluminum chloride, zinc chloride, boron trifluoride, magnesium chloride, copper chloride and lithium chloride.

In an embodiment, the organic acid comprises at least one agent selected from the group consisting of citric acid, gluconic acid, formic acid, ascorbic acid and oxalic acid.

In an embodiment, the concentration of the mixture in the second dispersion liquid is 0.1~1 g/ml.

In an embodiment, the weight of the Lewis acid is 1%~3% by weight of the mixture.

In an embodiment, the step of obtaining the graphene quantum dots after isolation and purification comprises: the resultant obtained by stripping for 2~3 hours under ultrasonic condition at 120~300 W was treated with column chromatography, removed the solvent by vacuum rotary evaporation to obtain the graphene quantum dots; wherein the stationary phase of chromatography column is silica gel or polyacrylamide, the first developing solvent is the mixed solution of dichloridemethane and methanol with the volume ratio being 1:1~3, and the second developing solvent is deionized water.

The method for preparing graphene quantum dots achieves the large-scale production of graphene quantum dots by microwave-solvothermal method. The process is simple and reduces the cost effectively. The graphene quantum dots can be produced in the large scale of gram or even kilogram. Meanwhile, after repeated stripping, the material of graphene oxide can be fully utilized to obtain a high yield.

EMBODIMENTS

To make the invention clear and easy to understand, the detailed description for specific execution mode of this invention was accomplished combined with the figure. The concrete details will be stated to understand the invention well. The invention can be executed by other ways which is different from this description; the person skilled in the art can do the similar improvement without against the connotation of this invention, therefore this invention is not restricted by the specific execution modes below.

Figure 1:
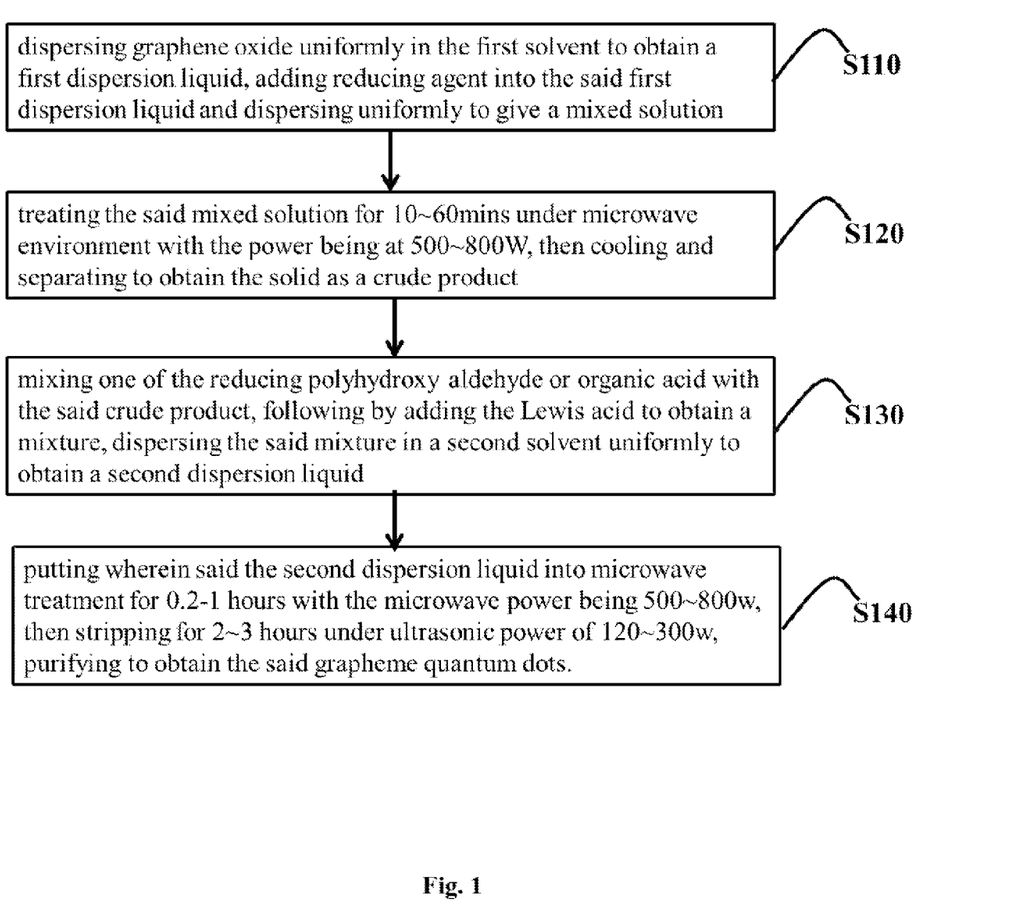
FIG. 1 is a flow chart of an embodiment of the method for preparing graphene quantum dots in large-scale.

Referring to the FIG. 1, in one embodiment the method for preparing graphene quantum dots in large-scale includes the steps of S110~step S140.

Step S110: adding graphene oxide to a first solvent and dispersing uniformly to obtain a first dispersion liquid, followed by adding a reducing agent to the first dispersion liquid and dispersing uniformly to give the mixed solution.

Preferably the graphene oxide is monolayer graphene oxide synthesized by improved Hummer's method.

The first solvent comprises at least one agent selected from the group consisting of water, dimethoxyethane, polyvinyl alcohol, glycerin, triethylene glycol and a N-methyl pyrrolidone. These solvents features higher boiling point and may provide a sufficiently high environment temperature for the deoxidation reduction of graphene oxide, and the high-boiling solvent and oxidized graphene no adverse reactions.

Preferably, the first solvent is an aqueous solution of polyvinyl alcohol. More preferably, the mass percentage of the aqueous solution of polyvinyl alcohol is 10%.

Preferably, the first dispersion liquid, the concentration range of grapheme oxide in the first dispersion is 2 mg/ml to 10 mg/ml.

Reductant comprises at least one agent selected from the group consisting of citric acid, gluconic acid, formic acid, ascorbic acid, oxalic acid, sodium citrate, sodium gluconate, sodium formate, sodium oxalate, sodium ascorbate, and the. Preferably, the reductant is oxalic acid.

Preferably, the weight ratio of grapheme oxide to reductant is 1:3~10. At the chosen weight ratio, Graphene oxide would be partly reduced to make the oxygen content of the partly reduced graphene oxide less but still remained. The Dirac cone of the graphene is damaged due to the introduction of the oxygen from graphene oxide, so that the graphene oxide would be energy band discontinuity and may have a semiconductor structure, which is conducive to the subsequent formation of a high quality graphene quantum dots.

The reducing agent is added to the first dispersion liquid and dispersing uniformly under ultrasonic condition to give the mixed solution, wherein graphene oxide and the reducing agent are dispersed uniformly.

Step S120: the mixture solution is treated for 10~60 mins under microwave environment, then cooled and filtered to obtain the filter cake as a crude product.

Preferably, before treated under microwave environment, the mixture solution is stirred under ultrasonic condition. Wherein the step of ultrasonic stirring comprises: stirring the mixture solution for 0.5~4 hours under ultrasonic at 120~300 W.

The purpose of ultrasonic stirring is stripping the reduced graphene oxide which would agglomerate again, promote the destruction of graphene oxide, and form the quantum dot thereby. Stirring for 0.5~4 hours under ultrasonic environment with the power being 120~300 W could make the agglomeration of the reduced graphene oxide stripped completely and destroyed to ensure formation of graphene quantum dots.

The mixture was put into a microwave environment after ultrasonic agitation to make graphene oxide undergo reductive cleavage reaction by microwave-solvothermal method. The reduction under microwave-solvothermal condition can complete the reductive cleavage of the graphene oxide effectively and reduce the size of the graphene sheet, in order to control the size of graphene quantum dots in the next step.

Preferably, the step of treating the mixed solution for 10~50 mins under microwave environment with the microwave power being 500~800 W comprises: the mixed solution is put into a sealed vessel and reacted for 5~30 mins under microwave environment with the microwave power being 500~800 W, then removed and the first solvent is added, continued to react for 5~30 mins under microwave environment with the microwave power being 500~800 W; wherein the volume of the additional first solvent is 10%~15% of the initial volume of the first solvent.

After treated for 5~30 mins under microwave environment with the microwave power being 500~800 W in the sealed vessel, part of the first solvent is decomposed directly and carbon sedimentate on the reactant during the microwave-solvothermal reaction, so the additional first solvent is necessary to maintain vapor pressure and facilitate the reaction. Therefore, the mixed solution was subjected to microwave-solvothermal reaction in two steps, and the first solvent is added to complete the second step after completion of the first step.

After the reaction, solid-liquid is separated and the solid was collected to give the crude product. Specific solid-liquid separation operation comprise: after the reaction mixture is cooled, deionized water is added to the reaction mixture to obtain a dispersion of the reactants, the dispersion of the reactants is dispersed for 5~30 mins under ultrasonic environment with the ultrasonic power being 120~300 W and then subjected to suction filtration to obtain a filtrate and cake, the filter cake is collected to obtain a crude product while the filtrate is retained to further separation in subsequent S140.

The volume ratio of the deionized water added to the reaction solution to the initial volume of deionized water in the first solvent is 1:10~20.

The filtrate is a solution of a smaller size graphene quantum dots. The filter cake, that is the crude product, is the larger the size of graphene quantum dots. To control the size of the graphene quantum dots furtherly, subsequent step S130 and S140 are continued to obtain the desired size of graphene quantum dots.

Step S130: mixing one of the reducing polyhydroxy aldehyde or organic acids with the crude product, following by adding a Lewis acid to obtain a mixture, then dispersing the mixture to a second solvent uniformly to obtain a second dispersion liquid.

Preferably, the reducing polyhydroxy aldehyde is a carbohydrate with hexagonal ring, and more preferably is glucose or adipaldehyde. Glucose and adipaldehyde are used as a reductant, as well as the carbon source supplemented to the carbocyclic of graphene quantum dots.

The structure of chosen carbohydrate with six-membered ring, such as glucose and adipaldehyde, matches with the structure of graphene, therefore carbohydrate would not result in Stone-Wales topology defects in the structure of graphene, and ensure higher quality of the final obtained graphene quantum dots.

The organic acid comprises at least one agent selected from the group consisting of citric acid, gluconic acid, formic acid, ascorbic acid and oxalic.

The second solvent comprises at least one agent selected from the group consisting of water, dimethoxyethane, polyvinyl alcohol aqueous solution, glycerol, triethylene glycol and N-methyl pyrrolidone.

Lewis acid comprises at least one agent selected from the group consisting of ferric chloride, aluminum chloride, zinc chloride, boron trifluoride, magnesium chloride, copper chloride and lithium chloride.

In order to increase the size of the quantum dot, the reducing polyhydroxy aldehyde was mixed with the crude product, and followed by the addition of the Lewis acid to give the mixture, then the mixture was dispersed uniformly in the second solvent to obtain the second dispersion liquid.

Preferably, the mass ratio of the crude product to reducing polyhydroxy aldehyde is 1:5~10. Preferably, the mass of the Lewis acid is 1%~3% by weight of the mixture of the reducing polyhydroxy aldehyde, the crude product and the Lewis acids.

In order to decrease the size of the quantum dot, the organic acid was mixed with the crude product, and followed by the addition of the Lewis acid to give the mixture, then the mixture was dispersed uniformly in the second solvent to obtain the second dispersion liquid.

Preferably, the mass ratio of the crude product to the organic acid is 1:5~10. Preferably, the mass of the Lewis acid is 1%~3% by weight of the mixture of the organic acid, the crude product and the Lewis acids.

Mixing the reducing polyhydroxy aldehyde with the crude product, following by adding the Lewis acid to obtain a mixture, then dispersing the mixture to a second solvent uniformly under ultrasonic conditions to obtain a second dispersion liquid.

Preferably, in the second dispersion liquid, the concentration of the mixture consisting of one of the reducing polyhydroxy aldehyde or organic acids, the crude product and the Lewis acid is 0.1 g/mL~1 g/mL.

Step S140: Putting the obtained dispersion liquid into microwave treatment for 0.2-1 hours with the microwave power being 500~800 w, stripping for 2~3 hours under ultrasonic power of 120~300 w, obtaining grapheme quantum dots after purification.

Preferably, before putting under microwave environment, the second dispersion liquid is treated under ultrasonic dispersion. The steps for ultrasonic dispersion comprise: putting the second dispersion liquid under ultrasonic environment for 0.5~2 hours with the ultrasonic power being 120 w~300 w, to make the mixture in the second dispersion liquid, which consists of one of the reducing polyhydroxy aldehyde or organic acids, the crude product and the Lewis acid, dispersed uniformly to facilitate the reaction.

After ultrasonic dispersion, putting the second dispersion liquid under microwave treatment for 0.2-1 hours with the microwave power being 500~800 w dispersing and stripping for 2~3 hours under ultrasonic power of 120~300 w, obtaining the grapheme quantum dots of desired size after purification.

Preferably, after putting the second dispersion liquid under microwave treatment for 0.2~1 hours with the microwave power being 500~800 w, diluting the yielded reaction solution with deionized water in order to facilitate the following dispersion and stripping, then dispersing and stripping for 2~3 hours under ultrasonic power of 120~300 w to obtain the aqueous solution of graphene quantum dots.

Preferably, the volume ratio of deionized water to the second solvent in the second dispersion liquid is 1:10~20.

In step S130 and step S140, graphene quantum dots are prepared by the hydrothermal method using reducing polyhydroxy aldehyde as carbon source, and then graphene particles are used as nucleating sources of quantum dot, which effectively increases the size of graphene quantum dots and the corresponding fluorescence spectra appears red shift. Thus, the yellow to red graphene quantum dots can be obtained.

Alternatively, in step S130 and step S140, graphene oxide quantum dots are prepared by the method using solvothermal of the second solvent and larger ultrasonic frequency to pyrolysis the carbon layer in the present of organic acids, and then graphene particles are used as nucleating sources of quantum dot and the second solvent is used to protect the quantum dots, which effectively reduce the size of the graphene quantum dots, and the corresponding fluorescence spectra appears blueshift. Thus, green and blue graphene quantum dots can be obtained.

The steps for isolation and purification comprise: an aqueous solution of graphene quantum dots is treated with column chromatography to obtain aqueous solutions of different size of graphene quantum dots successively, and then obtained aqueous solution of different sizes of graphene quantum dots are evaporated by rotary evaporation in vacuo, and dried to obtain different particle size powder of graphene quantum dots.

Preferably, in order to facilitate solvent evaporation, the aqueous solution of graphite quantum dots is extracted by the mixed solvent of dichloromethane and methanol at a volume ratio of 1:1~3:1, and then the mixed solvents are evaporated by rotary evaporation to obtain a smaller size powder of graphene quantum dots.

Preferably, the stationary phase for column chromatography is silica gel or polyacrylamide. The first developing solvent is the mixed solvents of dichloromethane and methanol at a volume ratio of 1:1~3, and the second developing solvent is deionized water.

The method of Column chromatography instead of dialysis for isolation and purification can effectively increase the yield, as well as speed up the reaction rate. At the meantime, graphene quantum dot particles can be efficiently obtained due to the easer observation of the movement of graphene quantum dots in the column by UV.

Preferably, the filtrate obtained in step S120, that is the solution of graphene quantum dots, is isolated and purified by above-mentioned column chromatography, and evaporated by rotary evaporation to obtain a dry powder of graphene quantum dot and improve the yield.

The above-mentioned method for preparing graphene quantum dots in large-scale complete the volume production of graphene quantum dots by microwave-solvothermal method. The process is simple and able to reduce the cost effectively, and the weight of graphene quantum dots can be prepared in a level of gram grade even kilogram. Meanwhile, after repeated stripping and size reducing, the material of graphene oxide can be fully utilized to obtain a high yield.

In the above-mentioned method for preparing graphene quantum dots in large-scale, the size of graphene quantum dots can be controlled well by hydrothermal method taking reducing polyhydroxy aldehyde as carbon source, or the solvothermal method in the present of organic acid. Good controllability is conducive for continuous production.

The present invention will be further illustrated with the following embodiments.

Embodiment 1

Preparation of Graphene Quantum Dots

Figure 2:
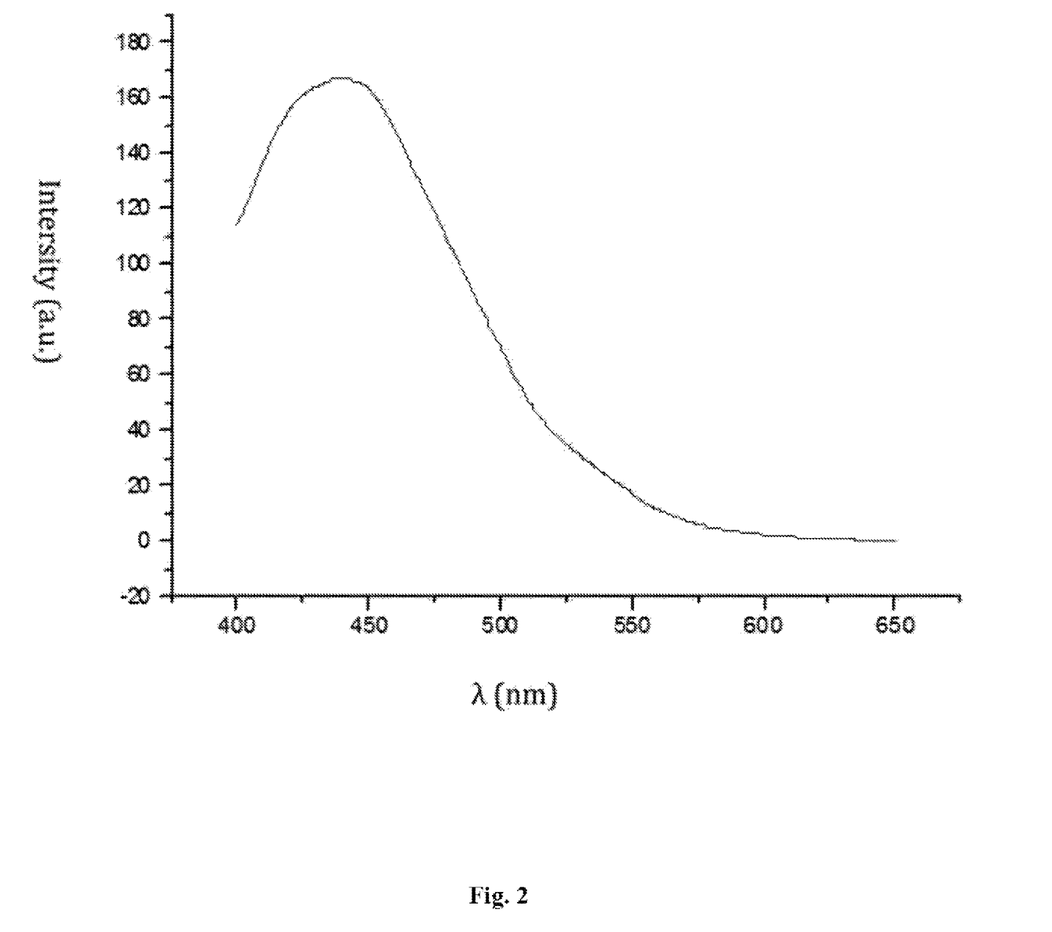
FIG. 2 is the fluorescence spectra of graphene quantum dots obtained from Embodiment 1.

1. Preparation of monolayer graphene oxide in improved Hummer's method. Dispersing monolayer graphene oxide in dimethoxyethane uniformly to give the first dispersion liquid with the concentration of monolayer graphene oxide being 2 mg/mL, adding the oxalic acid to the first dispersion liquid and dispersing uniformly to obtain the mixed liquid; wherein the mass ratio of monolayer graphene oxide to oxalic acid is 1:3;

2. Dispersing the mixed liquid for 4 hours under ultrasonic condition at 120 W, transferring to a sealed reaction vessel and reacting for 30 mins under microwave environment at 500 w, diluting the resultant with dimethoxyethane, wherein the volume of dimethoxyethane is 15% of the initial volume of dimethoxyethane in the first dispersion liquid, then continuing to react for 10 mins under microwave environment at 500 w, cooling down the reaction solution after completing and diluting with deionized water to obtain the reactant dispersion, wherein the volume:ratio of deionized water to dimethoxyethane initially added in the first dispersion liquid 1:10, dispersing the reactant dispersion liquid for 30 mins ultrasonic condition at 120 W, filtering to obtain a solution of graphene quantum dots as the filtrate and the crude product as filter cake;

3. Mixing the citric acid and the crude product with ferric chloride uniformly to give a mixture, wherein the weight ratio of the crude product to citric acid was 1:5 and the weight of ferric chloride is 3% of the weight of the mixture consisting of the crude product, citric acid and ferric chloride, adding N-methylpyrrolidone to the mixture, dispersing uniformly to obtain the second dispersion liquid with concentration of the mixture being of 0.5 g/mL;

4. Dispersing the second dispersion liquid for 2 hours under ultrasonic condition at 120 W, transferring to a sealed reaction vessel and reacting for 1 hour under microwave environment at 500 w, diluting the resultant with deionized water, wherein the volume ratio of deionized water to the N-methylpyrrolidone in the second dispersion liquid is 1:15, dispersing and stripping the diluted resultant for 2 hours wider ultrasonic condition at 300 w to obtain the aqueous solution of graphene quantum dots, treating the aqueous solution of graphene quantum dots and the aqueous solution of graphene quantum dots in step 2 with column chromatography, wherein the stationary phase of chromatography column is silica gel, the first developing solvent is dichloridemethane-methanol (volume ratio 1:3), and the second developing solvent is deionized water; obtaining solutions of graphene quantum dots with different particle size after column chromatography successively; evaporating the solution of graphene quantum dots in dichloridemethane-methanol (volume ratio 1:3) under vacuum rotary evaporation and drying to give the powder of graphene quantum dots; extracting the solution of graphene quantum dots in deionized water with the mixed dichloromethane-methanol at a volume ratio of 1:1, evaporating under vacuum rotary evaporation and drying to give the powder of graphene quantum dots;

FIG. 2 is the Fluorescence spectra of grapheme quantum dots obtained from Embodiment 1. As can be seen from FIG. 2, the emission wavelength of grapheme quantum dots obtained from Embodiment 1 is about 435 nm.

Embodiment 2

Preparation of Graphene Quantum Dots

Figure 3:
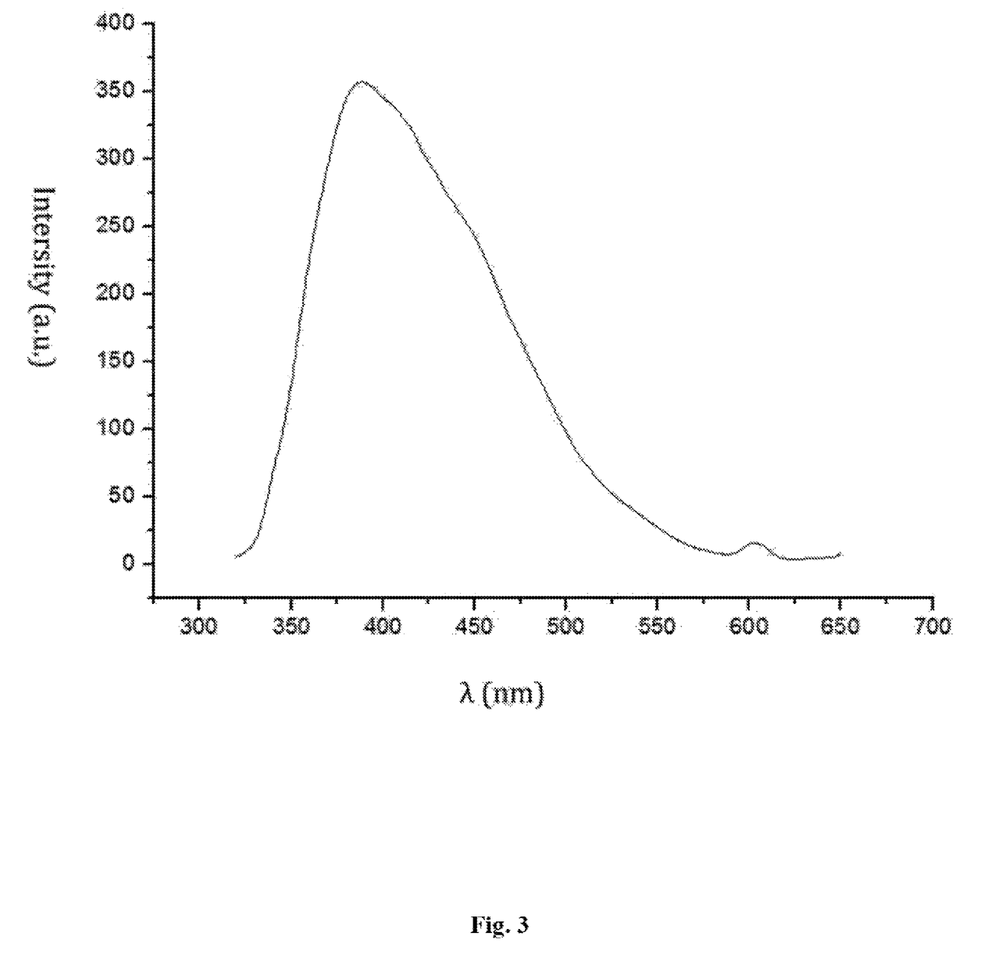
FIG. 3 is the fluorescence spectra of graphene quantum dots obtained from Embodiment 2.

1. Preparation of monolayer grapheme oxide in improved Hummer's method. Dispersing monolayer graphene oxide in mixed solvents of tripropylene glycol and N-methylpyrrolidone (volume ratio 1:11) uniformly to give the first dispersion liquid with the concentration of monolayer graphene oxide being 6 mg/mL, adding the sodium oxalate to the first dispersion liquid and dispersing uniformly to obtain the mixed liquid; wherein the mass ratio of monolayer graphene oxide to sodium oxalate is 1:8;

2. Dispersing the mixed liquid for 1 hour under ultrasonic condition at 150 W, transferring to a sealed reaction vessel and reacting for 20 mins under microwave environment at 700 W, diluting the resultant with the mixed solvents of tripropylene glycol and N-methylpyrrolidone (volume ratio 1:1), wherein the volume of the mixed solvents of tripropylene glycol and N-methylpyrrolidone is 12% of the initial volume of the mixed solvents in the first dispersion liquid, then continuing to react for 20 mins under microwave environment at 700 w, cooling down the reaction solution after completing and diluting with deionized water to obtain the reactant dispersion, wherein the volume ratio of deionized water to the mixed solvents of tripropylene glycol and N-methylpyrrolidone initially added in the first dispersion liquid is 1:20, dispersing the reactant dispersion liquid for 15 mins ultrasonic condition at 300 W, filtering to obtain a solution of graphene quantum dots as the filtrate and the crude product as filter cake;

3. Mixing the formic acid, ascorbic acid and the crude product with magnesium chloride and copper chloride uniformly to give a mixture, wherein the weight ratio of the crude product, ascorbic acid and formic acid was 1:4:4 and the total weight of magnesium chloride and copper chloride is 2.5% of the weight of the mixture consisting of the crude product, ascorbic acid, formic acid, magnesium chloride and copper chloride, adding mixed solvents of tripropylene glycol and N-methylpyrrolidone (volume ratio 1:1) to the mixture, dispersing uniformly to obtain the second dispersion liquid with concentration of the mixture being of 0.6 g/mL;

4. Dispersing the second dispersion liquid for 1.5 hours under ultrasonic condition at 180 W, transferring to a sealed reaction vessel and reacting for 0.5 hour under microwave environment at 550 w, diluting the resultant with deionized water, wherein the volume ratio of deionized water to the mixed solvent (tripropylene glycol and N-methylpyrrolidone) in the second dispersion liquid is 1:15, dispersing and stripping the diluted resultant for 3 hours under ultrasonic condition at 180 w to obtain the aqueous solution of graphene quantum dots, treating the aqueous solution of graphene quantum dots and the aqueous solution of graphene quantum dots in step 2 with column chromatography, wherein the stationary phase of chromatography column is silica gel, the first developing solvent is dichloridemethane-methanol (volume ratio 1:2), and the second developing solvent is deionized water; obtaining solutions of graphene quantum dots with different particle size after column chromatography successively; evaporating the solution of graphene quantum dots in dichloridemethane-methanol (volume ratio 1:2) under vacuum rotary evaporation and drying to give the powder of graphene quantum dots; extracting the solution of graphene quantum dots in deionized water with the mixed dichloromethane-methanol at a volume ratio of 2:1, evaporating under vacuum rotary evaporation and drying to give the powder of graphene quantum dots;

FIG. 3 is the Fluorescence spectra of grapheme quantum dots obtained from Embodiment 2. As can be seen from FIG. 3, the emission wavelength of grapheme quantum dots obtained from Embodiment 2 is about 380 nm.

Embodiment 3

Preparation of Graphene Quantum Dots

Figure 4:
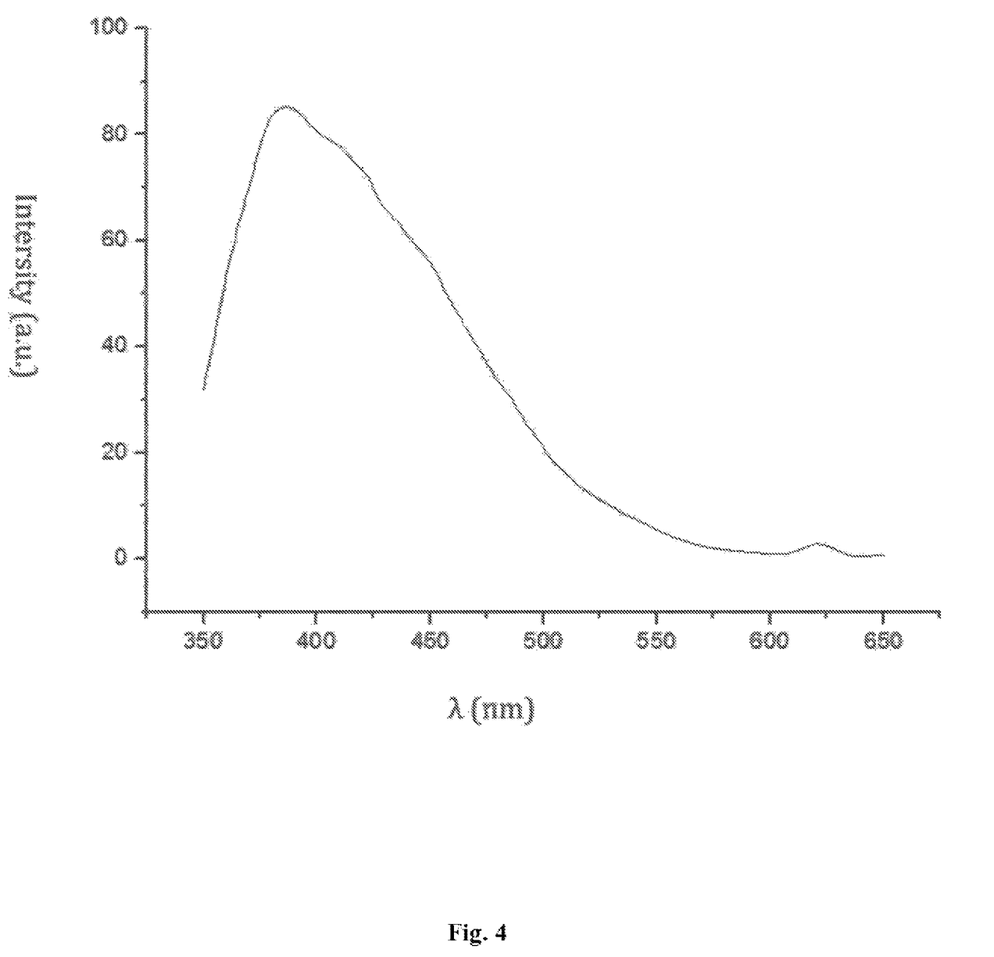
FIG. 4 is the fluorescence spectra of graphene quantum dots obtained from Embodiment 3.

1. Preparation of monolayer grapheme oxide in improved Hummer's method. Dispersing monolayer graphene oxide in water uniformly to give the first dispersion liquid with the concentration of monolayer graphene oxide being 3 mg/mL, adding the ascorbic acid to the first dispersion liquid and dispersing uniformly to obtain the mixed liquid; wherein the mass ratio of monolayer graphene oxide to ascorbic acid is 1:4;

2. Dispersing the mixed liquid for 3 hours under ultrasonic condition at 200 W transferring to a sealed reaction vessel and reacting for 8 mins under microwave environment at 650 W, diluting the resultant with water, wherein the volume of water is 10% of the initial volume of water in the first dispersion liquid, then continuing to react for 8 mins under microwave environment at 650 w, cooling down the reaction solution after completing and diluting with deionized water to obtain the reactant dispersion, wherein the volume ratio of deionized water to water initially added in the first dispersion liquid is 1:10, dispersing the reactant dispersion liquid for 18 mins ultrasonic condition at 150 W, filtering to obtain a solution of graphene quantum dots as the filtrate and the crude product as filter cake;

3. Mixing ascorbic acid and the crude product with boron trifluoride uniformly to give a mixture, wherein the weight ratio of the crude product to ascorbic acid is 1:9 and the weight of boron trifluoride was 1.5% of the weight of the mixture consisting of the crude product, ascorbic acid and boron trifluoride, adding water to the mixture, dispersing uniformly to obtain the second dispersion liquid with concentration of the mixture being of 0.2 g/mL;

4. Dispersing the second dispersion liquid for 1 hour under ultrasonic condition at 250 W, transferring to a sealed reaction vessel and reacting for 0.5 hour under microwave environment at 650 w, diluting the resultant with deionized water, wherein the volume ratio of deionized water to water in the second dispersion liquid is 1:10, dispersing and stripping the diluted resultant for 3 hours under ultrasonic condition at 270 w to obtain the aqueous solution of graphene quantum dots, treating the aqueous solution of graphene quantum dots and the aqueous solution of graphene quantum dots in step 2 with column chromatography, wherein the stationary phase of chromatography column is silica gel, the first developing solvent is dichloridemethane-methanol (volume ratio 1:2), and the second developing solvent is deionized water; obtaining solutions of graphene quantum dots with different particle size after column chromatography successively; evaporating the solution of graphene quantum dots in dichloridemethane-methanol (volume ratio 1:2) under vacuum rotary evaporation and drying to give the powder of graphene quantum dots; extracting the solution of graphene quantum dots in deionized water with the mixed dichloromethane-methanol at a volume ratio of 2:1, evaporating under vacuum rotary evaporation and drying to give the powder of graphene quantum dots;

FIG. 4 is the Fluorescence spectra of grapheme quantum dots obtained from Embodiment 3. As can be seen from FIG. 4, the emission wavelength of grapheme quantum dots obtained from Embodiment 3 is about 390 nm.

Embodiment 4

Preparation of Graphene Quantum Dots

Figure 5:
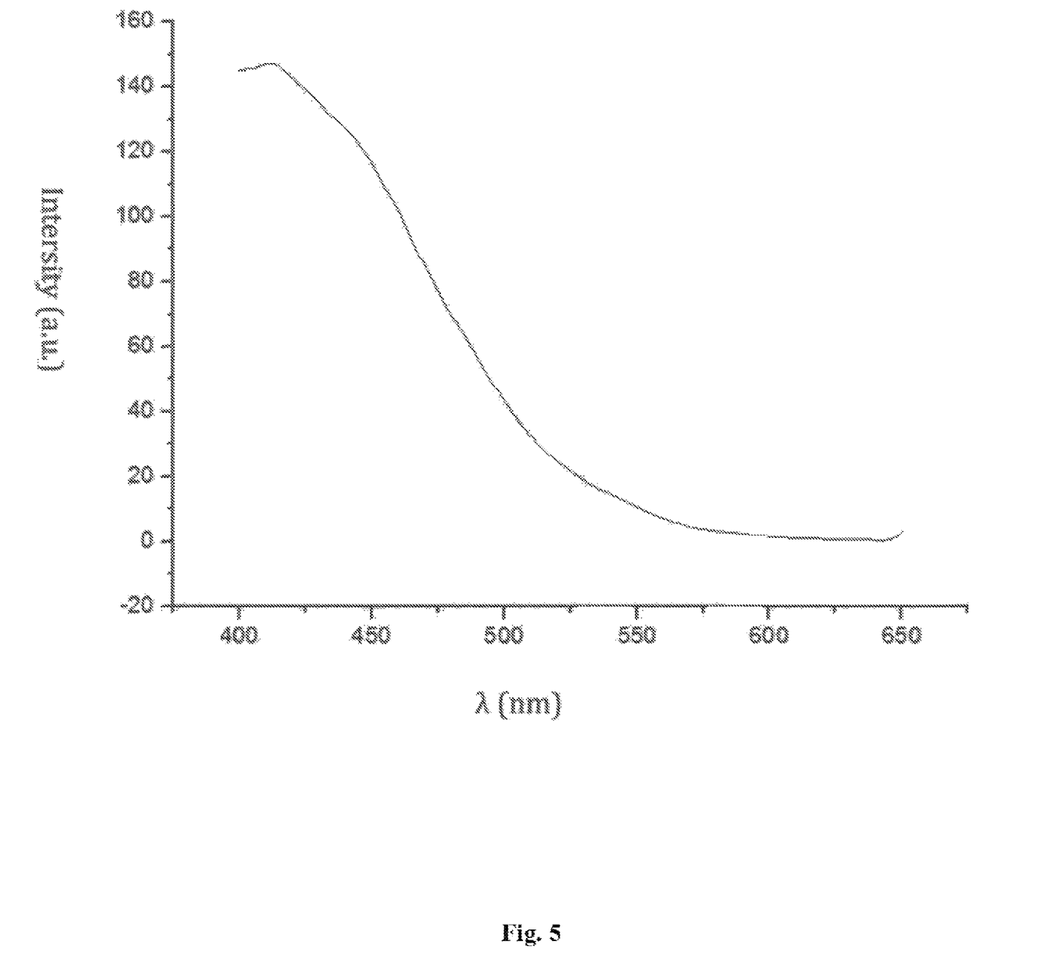
FIG. 5 is the fluorescence spectra of graphene quantum dots obtained from Embodiment 4.

1. Preparation of monolayer grapheme oxide in improved Hummer's method. Dispersing monolayer graphene oxide in glycerin uniformly to give the first dispersion liquid with the concentration of monolayer graphene oxide being 5 mg/mL, adding the sodium gluconate to the first dispersion liquid and dispersing uniformly to obtain the mixed liquid; wherein the mass ratio of monolayer graphene oxide to sodium gluconate is 1:6;

2. Dispersing the mixed liquid for 2 hours under ultrasonic condition at 200 W, transferring to a sealed reaction vessel and reacting for 10 mins under microwave environment at 600 W, diluting the resultant with glycerin, wherein the volume of glycerin is 10% of the initial volume of glycerin in the first dispersion liquid, then continuing to react for 10 mins under microwave environment at 600 w, cooling down the reaction solution after completing and diluting with deionized water to obtain the reactant dispersion, wherein the volume ratio of deionized water to glycerin initially added in the first dispersion liquid is 1:15, dispersing the reactant dispersion liquid for 20 mins ultrasonic condition at 180 w, filtering to obtain a solution of graphene quantum dots as the filtrate and the crude product as filter cake;

3. Mixing the citric acid and the crude product with zinc chloride uniformly to give a mixture, wherein the weight ratio of the crude product to citric acid is 1:7 and the weight of zinc chloride is 2% of the weight of the mixture consisting of the crude product, citric acid and zinc chloride, adding glycerin to the mixture, dispersing uniformly to obtain the second dispersion liquid with concentration of the mixture being of 0.5 g/mL;

4. Dispersing the second dispersion liquid for 1 hour under ultrasonic condition at 250 W, transferring to a sealed reaction vessel and reacting for 0.5 hour under microwave environment at 700 w, diluting the resultant with deionized water, wherein the volume ratio of deionized water to glycerin in the second dispersion liquid is 1:15, dispersing and stripping the diluted resultant for 3 hours under ultrasonic condition at 180 w to obtain the aqueous solution of graphene quantum dots, treating the aqueous solution of graphene quantum dots and the aqueous solution of graphene quantum dots in step 2 with column chromatography, wherein the stationary phase of chromatography column is silica gel, the first developing solvent is dichloridemethane-methanol (volume ratio 1:2), and the second developing solvent is deionized water; obtaining solutions of graphene quantum dots with different particle size after column chromatography successively; evaporating the solution of graphene quantum dots in dichloridemethane-methanol (volume ratio 1:2) under vacuum rotary evaporation and drying to give the powder of graphene quantum dots; extracting the solution of graphene quantum dots in deionized water with the mixed dichloromethane-methanol at a volume ratio of 2:1, evaporating under vacuum rotary evaporation and drying to give the powder of graphene quantum dots;

FIG. 5 is the Fluorescence spectra of graphene quantum dots obtained from Embodiment 4. As can be seen from FIG. 5, the emission wavelength of graphene quantum dots obtained from Embodiment 4 is about 410 nm.

Embodiment 5

Preparation of Graphene Quantum Dots

1. Preparation of monolayer grapheme oxide in improved Hummer's method. Dispersing monolayer graphene oxide in dimethoxyethane uniformly to give the first dispersion liquid with the concentration of monolayer graphene oxide being 2 mg/mL, adding the oxalic acid to the first dispersion liquid and dispersing uniformly to obtain the mixed liquid; wherein the mass ratio of monolayer graphene oxide to oxalic acid is 1:3;

2. Dispersing the mixed liquid for 4 hours under ultrasonic condition at 120 W, transferring to a sealed reaction vessel and reacting for 30 mins under microwave environment at 500 W, diluting the resultant with dimethoxyethane, wherein the volume of dimethoxyethane is 15% of the initial volume of dimethoxyethane in the first dispersion liquid, then continuing to react for 10 mins under microwave environment at 500 w, cooling down the reaction solution after completing and diluting with deionized water to obtain the reactant dispersion, wherein the volume ratio of deionized water to dimethoxyethane initially added in the first dispersion liquid is 1:10, dispersing the reactant dispersion liquid for 5 mins ultrasonic condition at 280 W, filtering to obtain a solution of graphene quantum dots as the filtrate and the crude product as filter cake;

3. Mixing the glucose and the crude product with iron chloride uniformly to give a mixture, wherein the weight ratio of the crude product and glucose was 1:5 and the weight of iron chloride is 1% of the weight of the mixture consisting of glucose, the crude product and iron chloride, adding dimethoxyethane to the mixture, dispersing uniformly to obtain the second dispersion liquid with concentration of the mixture being of 0.1 g/mL;

4. Dispersing the second dispersion liquid for 2 hours under ultrasonic condition at 120 W, transferring to a sealed reaction vessel and reacting for 1 hour under microwave environment at 500 w, diluting the resultant with deionized water, wherein the volume ratio of deionized water to dimethoxyethane in the second dispersion liquid is 1:20, dispersing and stripping the diluted resultant for 2 hours under ultrasonic condition at 300 w to obtain the aqueous solution of graphene quantum dots, treating the aqueous solution of graphene quantum dots and the aqueous solution of graphene quantum dots in step 2 with column chromatography, wherein the stationary phase of chromatography column is silica gel, the first developing solvent is dichloridemethane-methanol (volume ratio 1:3), and the second developing solvent is deionized water, obtaining solutions of graphene quantum dots with different particle size after column chromatography successively; evaporating the solution of graphene quantum dots in dichloridemethane-methanol (volume ratio 1:3) under vacuum rotary evaporation and drying to give the powder of graphene quantum dots; extracting the solution of graphene quantum dots in deionized water with the mixed dichloromethane-methanol at a volume ratio of 1:1, evaporating under vacuum rotary evaporation and drying to give the powder of graphene quantum dots.

Embodiment 6

Preparation of Graphene Quantum Dots

1. Preparation of monolayer grapheme oxide in improved Hummer's method. Dispersing monolayer graphene oxide in aqueous solution of polyvinyl alcohol with mass concentration of 10% uniformly to give the first dispersion liquid with the concentration of monolayer graphene oxide being 2 mg/mL, adding the mixture of citric acid and sodium citrate with the mass ratio of 1:1 to the first dispersion liquid and dispersing uniformly to obtain the mixed liquid; wherein the mass ratio of monolayer graphene oxide to the mixture of citric acid and sodium citrate is 1:10;

2. Dispersing the mixed liquid for 0.4 hour under ultrasonic condition at 300 W, transferring to a sealed reaction vessel and reacting for 5 mins under microwave environment at 800 W, diluting the resultant with aqueous solution of polyvinyl alcohol with mass concentration of 10%, wherein the volume of aqueous solution of polyvinyl alcohol with mass concentration of 10% is 10% of the initial volume of aqueous solution of polyvinyl alcohol with mass concentration of 10% in the first dispersion liquid, then continuing to react for 5 mins under microwave environment at 800 w, cooling down the reaction solution after completing and diluting with deionized water to obtain the reactant dispersion, wherein the volume ratio of deionized water to the aqueous solution of polyvinyl alcohol with mass concentration of 10% initially added in the first dispersion liquid is 1:12, dispersing the reactant dispersion liquid for 30 mins ultrasonic condition at 200 W, filtering to obtain a solution of graphene quantum dots as the filtrate and the crude product as filter cake;

3. Mixing the glucose and the crude product with aluminum chloride uniformly to give a mixture, wherein the weight ratio of the crude product and glucose was 1:10 and the weight of iron chloride aluminum chloride is 3% of the weight of the mixture consisting of glucose, the crude product and aluminum chloride, adding aqueous solution of polyvinyl alcohol with mass concentration of 10% to the mixture, dispersing uniformly to obtain the second dispersion liquid with concentration of the mixture being of 1 g/mL;

4. Dispersing the second dispersion liquid for 0.5 hour under ultrasonic condition at 300 W, transferring to a sealed reaction vessel and reacting for 0.2 hour under microwave environment at 800 w, diluting the resultant with deionized water, wherein the volume ratio of deionized water to aqueous solution of polyvinyl alcohol in the second dispersion liquid is 1:15, dispersing and stripping the diluted resultant for 3 hours under ultrasonic condition at 120 w to obtain the aqueous solution of graphene quantum dots, treating the aqueous solution of graphene quantum dots and the aqueous solution of graphene quantum dots in step 2 with column chromatography, wherein the stationary phase of chromatography column is silica gel, the first developing solvent is dichloridemethane-methanol (volume ratio 1:1), and the second developing solvent is deionized water; obtaining solutions of graphene quantum dots with different particle size after column chromatography successively; evaporating the solution of graphene quantum dots in dichloridemethane-methanol (volume ratio 1:1) under vacuum rotary evaporation and drying to give the powder of graphene quantum dots; extracting the solution of graphene quantum dots in deionized water with the mixed dichloromethane-methanol at a volume ratio of 1:1, evaporating under vacuum rotary evaporation and drying to give the powder of graphene quantum dots;

Embodiment 7

Preparation of Graphene Quantum Dots

1. Preparation of monolayer grapheme oxide in improved Hummer's method. Dispersing monolayer graphene oxide in Triethylene glycol uniformly to give the first dispersion liquid with the concentration of monolayer graphene oxide being 4 mg/mL, adding sodium oxalate to the first dispersion liquid and dispersing uniformly to obtain the mixed liquid; wherein the mass ratio of monolayer graphene oxide to sodium oxalate is 1:7;

2. Dispersing the mixed liquid for 2.5 hours under ultrasonic condition at 250 W, transferring to a sealed reaction vessel and reacting for 25 mins under microwave environment at 550 W, diluting the resultant with Triethylene glycol, wherein the volume of Triethylene glycol is 13% of the initial volume of Triethylene glycol in the first dispersion liquid, then continuing to react for 25 mins under microwave environment at 550 w, cooling down the reaction solution after completing and diluting with deionized water to obtain the reactant dispersion, wherein the volume ratio of deionized water to the Triethylene glycol initially added in the first dispersion liquid is 1:18, dispersing the reactant dispersion liquid for 10 mins ultrasonic condition at 220 W, filtering to obtain a solution of graphene quantum dots as the filtrate and the crude product as filter cake;

3. Mixing the adipaldehyde and the crude product with lithium chloride uniformly to give a mixture, wherein the weight ratio of the crude product and adipaldehyde was 1:6 and the weight of lithium chloride is 2.5% of the weight of the mixture consisting of adipaldehyde, the crude product and lithium chloride, adding Triethylene glycol to the mixture, dispersing, uniformly to obtain the second dispersion liquid with concentration of the mixture being of 0.3 g/mL;

4. Dispersing the second dispersion liquid for 1.8 hours under ultrasonic condition at 150 W, transferring to a sealed reaction vessel and reacting for 0.4 hour under microwave environment at 750 w, diluting the resultant with deionized water, wherein the volume ratio of deionized water to triethylene glycol in the second dispersion liquid is 1:15, dispersing and stripping the diluted resultant for 2.5 hours under ultrasonic condition at 250 w to obtain the aqueous solution of graphene quantum dots, treating the aqueous solution of graphene quantum dots and the aqueous solution of graphene quantum dots in step 2 with column chromatography, wherein the stationary phase of chromatography column is silica gel, the first developing solvent is dichloridemethane-methanol (volume ratio 1:2), and the second developing solvent s deionized water; obtaining solutions of graphene quantum dots with different particle size after column chromatography successively; evaporating the solution of graphene quantum dots in dichloridemethane-methanol (volume ratio 1:2) under vacuum rotary evaporation and drying to give the powder of graphene quantum dots; extracting the solution of graphene quantum dots in deionized water with the mixed dichloromethane-methanol at a volume ratio of 2:1, evaporating under vacuum rotary evaporation and drying to give the powder of graphene quantum dots;

The embodiments above are only a part of executive modes for our invention, they are specific and detailed, and no one can restrict the protection scope of our present invention through those modes. Any insubstantial change and replacement based on our present invention by technical staff in this field all belongs to the protection scope required by our invention. The protection scope of this invention is subject to the claims.

The invention claimed is:

1. A method for preparing graphene quantum dots on a large-scale, the method comprising:
dispersing graphene oxide uniformly in a first solvent to obtain a first dispersion liquid, adding a reducing agent into the first dispersion liquid and dispersing uniformly to generate a mixed solution;
treating the mixed solution for 10~60 mins under a microwave environment with a power of 500~800 W, then cooling and separating to obtain a solid crude product;
mixing a reducing polyhydroxy aldehyde or an organic acid with the solid crude product, adding a Lewis acid to obtain a mixture, dispersing the mixture in a second solvent uniformly to obtain a second dispersion liquid;
treating the second dispersion liquid with microwaves for 0.2-1 hours with a microwave power of 500~800 w, then stripping for 2~3 hours under an ultrasonic power of 120~300 w, and purifying to obtain graphene quantum dots.

2. The method of claim 1, wherein a step of ultrasonic stirring is performed before the step of treating the mixed solution under the microwave environment for 10-60 mins with the microwave power of 500~800 W,
wherein the step of ultrasonic stirring comprises:
stirring the mixed solution with the ultrasonic power of 120~300 W for 0.5~4 hours.

3. The method of claim 1, wherein a step of ultrasonic dispersion is performed before the step of treating the second dispersion liquid with microwaves for 0.2~1 hours with the microwave power of 500~800 W,
wherein the step of ultrasonic dispersion comprises:
dispersing the second dispersion liquid with the ultrasonic power of 120~300 W for 0.5~2 hours.

4. The method of claim 1, wherein the first solvent and the second solvent both comprises at least one agent selected from the group consisting of water, dimethoxyethane, an aqueous solution of polyvinyl alcohol, glycerol alcohol, polyhydroxy aldehyde and N-methylpyrrolidone.

5. The method of claim 1, wherein a concentration of graphene oxide in the first dispersion liquid is 2~10 mg/ml.

6. The method of claim 1, wherein the reducing agent comprises at least one agent selected from the group consisting of citric acid, gluconic acid, formic acid, ascorbic acid, oxalic acid, sodium citrate, sodium gluconate, sodium formate, sodium oxalate and sodium ascorbate.

7. The method of claim 1, wherein a weight ratio of the graphene oxide to the reducing agent is 1:3~10.

8. The method of claim 1, wherein the step of treating the mixed solution for 10~60 mins under the microwave environment with the microwave power of 500~800 W further comprises: reacting the mixed solution for 5~30 mins under the microwave environment with the microwave power of 500~800 W, then removing and adding the first solvent, continuing to react for 5~30 mins under the microwave environment with the microwave power of 500~800 W; wherein a volume of an additional first solvent is 10%~15% of a initial volume of the first solvent.

9. The method of claim 1, wherein a weight ratio of the solid crude product to one of the reducing polyhydroxy aldehyde and organic acid is 1:5~10.

10. The method of claim 1, wherein the reducing polyhydroxy aldehyde is glucose or adipaldehyde.

11. The method of claim 1, wherein the Lewis acid comprises at least one agent selected from the group consisting of ferric chloride, aluminum chloride, zinc chloride, boron trifluoride, magnesium chloride, copper chloride and lithium chloride.

12. The method of claim 1, wherein the organic acid comprises at least one agent selected from the group consisting of citric acid, gluconic acid, formic acid, ascorbic acid and oxalic acid.

13. The method of claim 1, wherein a concentration of the mixture consisting of the solid crude product, the Lewis acid and one of the reducing polyhydroxy aldehyde and the organic acid is 0.1~1 g/ml.

14. The method of claim 1, wherein a weight of the Lewis acid is 1%~3% by weight of the mixture.

15. The method of claim 1, wherein the step of obtaining graphene quantum dots after an isolation and a purification further comprises:
treating a resultant obtained by stripping for 2~3 hours with column chromatography, and evaporating under vacuum rotary evaporation to generate purified graphene quantum dots;
wherein a stationary phase of the chromatography column is silica gel or polyacrylamide, wherein the first solvent consists of a mixed solution of dichloridemethane and methanol with volume ratio of 1:1~3, and the second solvent consists of deionized water.

* * * * *